(12) United States Patent
Krishnamoorthy et al.

(10) Patent No.: US 10,356,714 B2
(45) Date of Patent: Jul. 16, 2019

(54) METHODS AND APPARATUS FOR NEGOTIATING NETWORK SIP RESOURCES BASED ON DEVICE CAPABILITIES

(71) Applicant: QUALCOMM Incorporated, San Diego, CA (US)

(72) Inventors: Parthasarathy Krishnamoorthy, San Diego, CA (US); Naveen Kumar Pasunooru, Hyderabad (IN); Prashanth Mohan, Chennai (IN); Raevanth Venkat Annam, Tuticorin (IN); Ramachandran Subramanian, San Diego, CA (US); KrishnaKumar Vasanthasenan, Hyderabad (IN); Sambasiva Rao Pamarthi, Hyderabad (IN); Abhilash Singh Rajpoot, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/499,637

(22) Filed: Apr. 27, 2017

(65) Prior Publication Data

US 2018/0317165 A1    Nov. 1, 2018

(51) Int. Cl.
*H04B 7/185*       (2006.01)
*H04B 7/00*        (2006.01)
(Continued)

(52) U.S. Cl.
CPC ......... *H04W 52/0209* (2013.01); *H04W 4/70* (2018.02); *H04W 52/0216* (2013.01);
(Continued)

(58) Field of Classification Search
None
See application file for complete search history.

(56) References Cited

U.S. PATENT DOCUMENTS

2007/0259651 A1* 11/2007 Bae ................... H04L 29/06027
                                                          455/412.1
2009/0046641 A1*  2/2009 Wang ................. H04W 74/002
                                                          370/329
(Continued)

FOREIGN PATENT DOCUMENTS

WO    WO-2015185131 A1    12/2015
WO    WO-2016148752 A1     9/2016

*Primary Examiner* — San Htun
(74) *Attorney, Agent, or Firm* — Michael F. Taveira

(57) ABSTRACT

One aspect of the present application provides a Category M apparatus that communicates over a communication network. The apparatus comprises a processor and an interface. The processor is configured to generate a message requesting registration of the apparatus with a core network, the message generated to include at least one header indicating a power saving mode capability of the apparatus. The processor is further configured to schedule sleep periods and wakeup times for the apparatus. The interface is configured to transmit the message to the core network. The interface is further configured to receive a response, from the core network, including one or more parameters and one or more timers established by the core network based at least in part on the power saving mode capability of the apparatus.

16 Claims, 5 Drawing Sheets

(51) Int. Cl.
*H04W 52/02* (2009.01)
*H04W 60/00* (2009.01)
*H04W 4/70* (2018.01)
*H04B 1/38* (2015.01)
*H04B 1/04* (2006.01)

(52) U.S. Cl.
CPC ... *H04W 52/0219* (2013.01); *H04W 52/0229* (2013.01); *H04W 60/00* (2013.01)

(56) References Cited

U.S. PATENT DOCUMENTS

| | | | |
|---|---|---|---|
| 2010/0323647 A1* | 12/2010 | Ryu | H04W 52/0251 455/127.5 |
| 2014/0140296 A1* | 5/2014 | Choi | H04J 11/0036 370/329 |
| 2015/0327327 A1* | 11/2015 | Jain | H04W 76/38 370/328 |
| 2016/0073338 A1* | 3/2016 | Kim | H04W 52/02 370/311 |
| 2016/0242234 A1 | 8/2016 | Takeda et al. | |
| 2016/0295504 A1 | 10/2016 | Wang et al. | |

* cited by examiner

METHODS AND APPARATUS FOR NEGOTIATING NETWORK SIP RESOURCES BASED ON DEVICE CAPABILITIES

BACKGROUND

Field

The present application relates generally to wireless communications, and more specifically, to systems, methods, and devices for coordinating communications with power saving capable stations.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Wireless communication systems are widely deployed to provide various types of communication content such as voice and data. Typical wireless communication systems may be multiple-access systems capable of supporting communication with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), LTE Unlicensed (LTE-U), LTE Direct (LTE-D), License-Assisted Access (LAA), MuLTEfire, etc. These systems may be accessed by various types of user equipment (stations) adapted to facilitate wireless communications, where multiple stations share the available system resources (e.g., time, frequency, and power).

Wireless networks are often preferred when network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The prevalence of multiple wireless networks and multiple stations may cause interference, reduced throughput (for example, because each wireless network or each station is operating in the same area and/or spectrum or trying to communicate simultaneously), and/or prevent other devices from communicating. For the volume and complexity of information communicated wirelessly between multiple devices, the required overhead bandwidth continues to increase. Devices may operate in close proximity to one another and operating over different radio access technologies (RATs) and/or different communication protocols. As more devices are designed to have "smart" technology, for example, kitchen appliances, interferences over networks further intensify. Additionally, many devices may include capabilities to operate in power saving modes, by which the devices may operate with reduced power consumption. During such power saving modes, the devices may suspend or reduce communications. Devices with such capabilities must be coordinated with the RATs and other network devices to enable efficient and proper use of these capabilities in conjunction with the network connectively. Thus, improved systems and methods for communicating power saving mode capabilities between stations and wireless networks are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages that include improved communications between access points and stations in a wireless network. Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present application provides a Category M apparatus that communicates over a communication network. The apparatus comprises a processor and an interface. The processor is configured to generate a message requesting registration of the apparatus with a core network, the message generated to include at least one header indicating a power saving mode capability of the apparatus. The processor is further configured to schedule sleep periods and wakeup times for the apparatus. The interface is configured to transmit the message to the core network. The interface is further configured to receive a response, from the core network, including one or more parameters and one or more timers established by the core network based at least in part on the power saving mode capability of the apparatus.

Another aspect of the present application provides method of communicating over a communication network by a Category M apparatus. The method comprises generating a message requesting registration of the apparatus with a core network, the message generated to include at least one header indicating a power saving mode capability of the apparatus. The method further comprises scheduling sleep periods and wakeup times for the apparatus. The method further also comprises transmitting the message to the core network. The method also comprises receiving a response, from the core network, including one or more parameters and one or more timers established by the core network based at least in part on the power saving mode capability of the apparatus.

Another aspect of the present application provides a Category M apparatus that communicates over a communication network. The apparatus comprises means for generating a message requesting registration of the apparatus with a core network, the message generated to include at least one header indicating a power saving mode capability of the apparatus. The apparatus further comprises means for scheduling sleep periods and wakeup times for the apparatus. The apparatus also comprises means for transmitting the message to the core network. The apparatus further also comprises means for receiving a response, from the core network, including one or more parameters and one or more timers established by the core network based at least in part on the power saving mode capability of the apparatus.

An additional aspect of the present application provides a non-transitory, computer-readable storage medium. The medium comprises code executable to generate a message requesting registration of the apparatus with a core network, the message generated to include at least one header indicating a power saving mode capability of the apparatus. The medium further comprises code executable to schedule sleep periods and wakeup times for the apparatus. The medium also comprises code executable to transmit the message to the core network. The medium also further comprises code executable to receive a response, from the core network, including one or more parameters and one or more timers established by the core network based at least in part on the power saving mode capability of the apparatus.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

DETAILED DESCRIPTION

Figure 1:
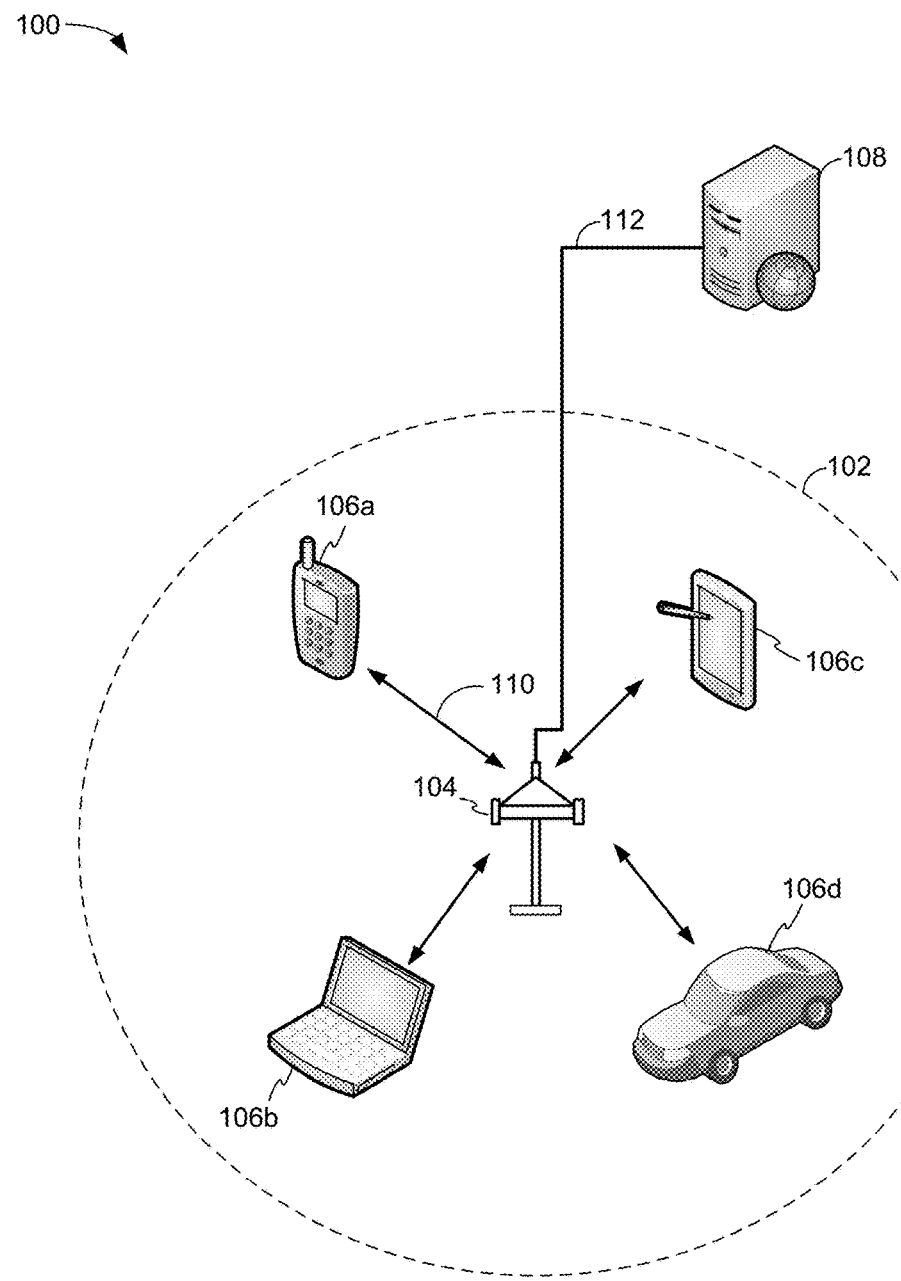
FIG. 1 illustrates a wireless communication system in which aspects of the present disclosure can be employed.

Various aspects of the novel systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown, but is to be accorded with the widest scope consistent with the principles and features disclosed herein Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some implementations, a WLAN includes various devices which access the wireless access network. For example, there may be: access points ("APs") and stations (also referred to as clients, wireless stations, user equipment, UEs, and STAs, among other names). In general, an access point serves as a hub, a router, or a base station for the stations in the WLAN. A station may be a laptop computer, a personal digital assistant (PDA), a mobile phone, a smart device, a smart appliance, or any type of computer-based device that can access the WLAN. In an example, a station connects to an access point via a Wi-Fi (e.g., IEEE 802.11 protocol such as 802.11ah) compliant wireless link to obtain general connectivity to the Internet, to one or more other stations and/or access points on the WLAN, or to other wide area access networks. In some implementations, a station may also be used as an access point.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing this particular wireless protocol may consume less power than devices implementing other wireless protocols, may be used to transmit wireless signals across short distances, and/or may be able to transmit signals less likely to be blocked by objects, such as humans.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). The cdma2000 is described in documents from an organization named "3rd Generation Partnership Project 2" (3GPP2). These various radio technologies and standards are known in the art.

The disclosed techniques may also be applicable to technologies and the associated standards related to LTE-A, LTE-U, LTE-D, LTE, MuLTEfire, W-CDMA, TDMA, OFDMA, High Rate Packet Data (HRPD), Evolved High Rate Packet Data (eHRPD), Worldwide Interoperability for Microwave Access (WiMax), GSM, enhanced data rate for GSM evolution (EDGE), and so forth. MuLTEfire is an LTE-based technology that solely operates in unlicensed spectrum, and does not require an "anchor" in licensed spectrum. Terminologies associated with different technologies can vary. LTE-D is a device-to-device technology that utilizes the licensed LTE spectrum and was released as part of 3GPP Release 12. LTE-D devices can communicate directly with other devices by sending a message in the network allocated slot and bandwidth. In some embodiments, depending on the technology considered, the station used in UMTS can sometimes be called a mobile station, a station, a user terminal, a subscriber unit, an access terminal, etc., to name just a few. Likewise, Node B used in UMTS can sometimes be called an evolved Node B (eNodeB or eNB), an access node, an access point, a base station (BS), HRPD base station (BTS), and so forth. It should be noted here that different terminologies apply to different technologies when applicable The disclosed techniques may also be applicable to various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency-Division Multiple Access (OFDMA) systems, Single-Carrier Frequency-Division Multiple Access (SC-FDMA) systems, and so forth. An SDMA system may utilize sufficiently different directions to concurrently transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency-division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE (3rd Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal. An access point may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Router, Radio Transceiver, Basic Service Set ("BSS"), Extended Service Set ("ESS"), Radio Base Station ("RBS"), or some other terminology. A station ("STA") may also comprise, be implemented as, or known as a user terminal ("UT"), an access terminal ("AT"), a subscriber station, a client, a wireless client, a wireless station, a subscriber unit, a mobile station, a remote station, a remote terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a smart device, a smart appliance, or any type of suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, a smart device, a smart appliance, or any other suitable device that is configured to communicate via a wireless medium.

It is well-known that in certain types of wireless networks, such as a WLAN, the wireless channel, or medium, may be used by only one station transmitter within range of the current transmission at any given time. For example, when one station on the WLAN transmits messages to an access point (e.g., a router) on the WLAN, the other stations on the WLAN cannot transmit at the same time. Furthermore, when an access point transmits over the WLAN, all of the stations within range prioritize receiving the transmission from the access point. That is, although only one station on the WLAN can transmit at one time, all of the devices on the WLAN may receive messages at the same time. And although transmission times are often short (e.g., on the order of microseconds to milliseconds), as the number of devices on the network increases, the likelihood of transmission interferences increases. Existing systems utilize certain mechanisms to reduce such network collisions. For example, systems utilize the well-known ready-to-send (RTS) and clear-to-send (CTS) mechanism for wireless medium reservation over particular time periods to reduce network collisions and increase quality-of-service (QoS) for the network.

However, as the number of devices connected to networks, such as WLANs, increases, so too do the network interferences and required idle times. For example, the quantity of so-called "Internet of Things" (also referred to as "IoT") devices connected to any given network has increased in recent years. Smart refrigerators, smart thermostats, smart ovens, smart watches, smart microwaves, smart door locks, smart lightbulbs, smart TVs, and further network-connected devices of all kinds, mobile and stationary, small and large, can often total hundreds of devices connected to a network, such as a WLAN. Thus, when only one device on the network can transmit at any given time, the number of transmission interferences can increase greatly. Furthermore, many of these IoT devices may implement various power saving modes and/or capabilities to reduce power consumption and unnecessary network bandwidth based on communication needs of each IoT device. In current network implementations, the network over which these IoT devices communicate may not be aware of the power saving mode and/or power saving capabilities of these IoT devices. Accordingly, when the IoT devices enter a power saving mode, the network, which may not receive communications from the IoT devices for extended periods of time, may disconnect or disassociate the IoT devices as not being present. This may cause issues for the IoT devices when they exit the power saving mode and wish to communicate over the network again. For example, when the IoT devices have been disconnected or disassociated, they may have to re-associate with the network before they are able to communication over the network. Alternatively, or additionally, when the network and the IoT device first associates (e.g., when the IoT device requests association with the network), if the network is unaware of the IoT device's power saving capabilities, then the network may request communication intervals or other parameters that would otherwise conflict with the IoT device's power saving capability. For example, the network may set default timers and/or other resources for the IoT device when the network is not aware of the IoT device's power saving capability. Thus default timers may increase a number of times that the IoT device must wake or otherwise exit from the power saving mode to communicate with the network, increasing power consumption by the IoT device and increasing unnecessary communications over the network by the IoT device. Thus, such conditions result in poor overall utilization of the network channel medium, particularly in networks including several IoT devices (or other power saving devices or stations).

On a traditional WLAN, when one device transmits (e.g., a station to an access point, or vice versa), the other devices within transmission range of the station and/or the access point cannot also transmit at the same time. Traditionally, these devices will instead wait, or idle, for their turn to transmit. To maximize the utilization of the network channel medium and minimize power utilized by the stations of the network, the stations may implement one or more power saving modes. Aspects of the present disclosure may enable the stations to communicate their power saving capabilities and operating modes to the network. This allows stations to enter power saving modes to reduce power consumption without impacting their connectivity and/or association with the network. By communicating the power saving capabilities and/or operating modes of the stations to the network, the network may be able to coordinate communications parameters and/or timers. In short, the aspects of the present disclosure allow wireless clients on a network, such as a WLAN, to transmit power saving capabilities to the core network and to associate with the core network. In view of the many complications described above that IoT devices experience when operating on modern-day networks, such advantages can be particularly useful for networks that include one or more wireless IoT devices, which is common.

Although the embodiments described below convey aspects of the present disclosure from the perspective of a single station on a WLAN, the aspects can be implemented and/or performed on any number of, or all of, the stations on a network, such as a WLAN. For example, each of the stations connected to a WLAN may incorporate the embodiments described below, for instance, as a one-time, preliminary configuration per station. Thereafter, each of the stations can benefit from the technical advantages. Furthermore, although the embodiments described below may be described with respect to a particular number of stationary IoT devices, the systems described herein may also be implemented on a lower or higher number of IoT devices, on any number of non-IoT devices, on any number of mobile IoT devices, and/or on any combination of network-based devices on any network. Finally, the descriptions of the embodiments below utilize several examples of particular IoT devices for ease of understanding. However, the example devices are in no way meant to limit the types of IoT devices, smart devices, or any other types of network-capable devices that may utilize and benefit from the embodiments described below.

FIG. 1 illustrates a wireless communication system 100 in which aspects of the present disclosure can be employed. The wireless communication system 100 may operate pursuant to a wireless standard, for example, an 802.11ac standard or an 802.11n standard, among others. The wireless communication system 100 may include an access point 104, which communicates with stations 106*a*, 106*b*, 106*c*, and/or 106*d*, also individually or collectively referred to as the station 106 or the stations 106, respectively. The access point 104 and/or the stations 106 may also communicate with additional stations (not pictured). The stations 106 may also individually or collectively operate as an access point, or vice versa. The stations 106 may be in wireless communication with one or both of a cellular network (e.g., a 2G, 3G, 4G LTE, LTE-U, LTE-D, and/or MuLTEfire network) through the access point 104 or with a non-cellular network (e.g., wireless local area network (WLAN)) through the access point 104, or some other access point (not illustrated). The stations 106 may also be in wireless communication with an internet protocol multimedia subsystem (IMS) or similar core network 108 through the access point 104 or some other access point (not illustrated). The access point 104 may communicate with the core network 108 through a wired connection 112. The core network 108 may provide various services to the access point 104 and the stations 106.

As mentioned, the wireless communication system 100 may include operation pursuant to a wireless standard, for example the 802.11ah, 802.11ac, 802.11n, 802.11g, 802.11b, or other 802.11 based standard. As shown, the access point 104 may provide communication coverage in a basic service area 102. For example, the access point 104 may function as a wireless router that serves one or more of the stations 106 within the basic service area 102. The stations 106 may comprise wireless devices that are located within the basic service area 102. The stations 106 may communicate with the access point 104 over wireless communication links 110. In one example, the communication link 110 can represent a Wi-Fi signal being transmitted and/or received by one or more of the stations 106 and/or the access point 104. As another example, the communication link 110 can represent signals being sent and received between the access point 104 and the stations 106 in accordance with code division multiple access (CDMA) techniques. As another example, the stations 106 can communicate with the access point 104 via the communication link 110 using a cellular network (e.g., LTE), functioning as an LTE station. To these example ends, the communications exchanged between the stations 106 and/or the access point 104 in the wireless communication system 100 may include data units, which may comprise packets, frames, subframes, bits, etc. Furthermore, the devices may use any suitable network type and configuration, for example, those described above in the beginning paragraphs of the Detailed Description.

More specifically, a portion of the communication link 110 that facilitates transmission from the access point 104 to one or more of the stations 106 can be referred to as a downlink (i.e., the portion of the communication link 110 that points at one of the stations 106), and a communication link that facilitates transmission from one or more of the stations 106 to the access point 104 can be referred to as an uplink (i.e., the portion of the communication link 110 that points at the access point 104). Alternatively, a downlink can be referred to as a forward link or a forward channel, and an uplink can be referred to as a reverse link or a reverse channel. The access point 104 may connect to one or more channels so as to communicate with the stations 106. The access point 104 may perform a channel identification procedure prior for connecting to one or more of the channels. The channel identification procedure and/or the channel connections may be subject to and operate in accordance with certain government regulations, e.g., DFS radar regulations.

The access point 104 may act as a base station, or a router, and provide wireless communication coverage in the basic service area 102. The access point 104 along with the stations 106 associated with the access point 104 and that use the access point 104 for communication can be referred to as a basic service set (BSS). It should be noted that, in some instances, the wireless communication system 100 may not have a central access point, but rather may function as a peer-to-peer network between the stations 106. Accordingly, the functions of the access point 104 described herein may alternatively be performed by one or more of the stations 106 that is coupled to the core network 108.

The access point 104 may provide the stations 106 with a connection to the core network 108 via the connection 112. The connection 112 may include uplink and downlink portions as described in relation to the communication link 110, though not shown. The core network 108 may correspond to a framework that provides IP multimedia services to aid the access of multimedia and voice applications from stations. The core network 108 may also correspond to a part of the network that provides services to the connected stations via the access network (e.g., telephone call services, multimedia exchange services, etc.). Thus, via the core network 108, the access point 104 and the stations 106 may be provided access to the Internet or other various network services.

The station(s) 106 and the core network 108 may include various negotiated timers, etc., corresponding to periodic procedures. For example, the station 106 and the core network 108 may negotiate timers for registering or re-registering the station 106 with the core network 108. For example, re-registration may occur when the station 106 registration with the core network 108 expires. This expiration may occur when a registration or REGISTER timer expires. The registration timer or timers may include a timer at the core network 108 and a timer at the station 106. The registration timer at the station 106 may be set to a value less than the registration timer of the core network 108 to ensure that the station 106 re-registers or renews the station's registration before the station's registration expires with the core network 108. For example, when registering with the core network 108, the station 106 may communicate a message including a timer value corresponding to the registration expiration duration or period. The station 106 may renew the station's registration (e.g., by sending another registration message) before the registration expiration duration passes or expires.

Similarly, the station 106 and the core network 108 may negotiate one or more timers for subscription of the station 106 (e.g., an application operating on the station 106) to a service provided by the core network 108. Similar to the registration timer(s) discussed herein, subscription timer(s) may be used to terminate and/or renew subscriptions between the station 106 and the service of the core network 108. Accordingly, re-subscription may occur when the station 106 subscription with the core network 108 expires. This expiration may occur when a subscription or SUBSCRIBE timer expires. The subscription timer or timers may include a timer at the core network 108 and a timer at the station 106. The subscription timer at the station 106 may be set to a value less than the subscription timer of the core network 108 to ensure that the station 106 re-subscribes or renews the station's subscription before the station's subscription expires with the core network 108. For example, when establishing a subscription with the service of the core network 108, the station 106 may communicate a subscription message including a timer value corresponding to the subscription expiration duration or period. The station 106 may renew the station's subscription (e.g., by sending another subscription message) before the subscription expiration duration passes or expires.

Additionally, the station 106 and the core network 108 may negotiate one or more timers for publication of information from the core network 108 or a service of the core network 108 to the station 106 (e.g., a voice mail service sending information to the station 106). Similar to the registration and subscription timer(s) discussed herein, publication timer(s) may be used to terminate and/or renew publication associations between the station 106 and the service of the core network 108. Accordingly, re-publication may occur when the station 106 publication association with the core network 108 expires. This expiration may occur when a publication or PUBLISH timer expires. The publication timer or timers may include a timer at the core network 108 and a timer at the station 106. The publication timer at the station 106 may be set to a value less than the publication timer of the core network 108 to ensure that the station 106 re-publishes or renews the station's publication association before the station's publication association expires with the core network 108. For example, when establishing a publication association with the service of the core network 108, the station 106 may communicate a publication message including a timer value corresponding to the publication expiration duration or period. The station 106 may renew the station's publication (e.g., by sending another publication message) before the publication expiration duration passes or expires (e.g., at the core network 108).

In some aspects, the stations 106 can be required to associate with the access point 104 in order to send communications to and/or receive communications from the access point 104. In some aspects, the stations 106 may associate with the core network 108 in order to send communications to and/or receive communications from the core network 108 via the access point 104. In one aspect, information for associating is included in a broadcast by the access point 104 (e.g., in a beacon; not pictured). To receive such a broadcast, the station 106 may, for example, perform a broad coverage search over a coverage region. A search may also be performed by the station 106 by sweeping a coverage region in a lighthouse fashion, for example. After receiving the information for associating, or without receiving the information for associating, the station 106 may transmit a reference signal, such as an association probe or request, to the access point 104. In some aspects, the access point 104 may use backhaul services, for example, to communicate with a larger network, such as the core network 108, which may be connected to the Internet or a public switched telephone network (PSTN). The association probe or request from the station 106 may also function to associate the station 106 with the core network 108.

In some embodiments, the stations 106 may be devices that generally spend extended durations connected to the network. For example, the station 106a can be a cellular phone, a pager, or a text messaging device. The station 106a may connect to one or more of a 3G network, a 4G network, an LTE network, an 802.11 network, or any other communication network. In some embodiments, the stations 106 may be communication devices that utilize the network on a less frequent basis as compared to cellular phones or pagers, which may be connected to the network for a majority of time when they are turned on. For example, the station 106b may be a computer or the station 106c may be a tablet.

In an embodiment, the stations 106 may be IoT devices. For example, the station 106d can be a car or vehicle with cellular or "smart" technology. In some embodiments, the station 106 is a smart light bulb (or "smart bulb"), a smart thermostat, a smart door lock (or "smart lock"), a smart consumer product, smart consumer packaging, or a smart appliance. In other words, each of these IoT devices can have network-enabled features that allow them to perform "smart" features, such as communicating with one or more other IoT devices or the core network 108 via the access point 104.

One or more of the stations 106 may include a power saving mode. The power saving mode may permit the station 106 to enter a state (e.g., a power saving state) where power consumption by the station 106 is reduced as compared to a normal state. For example, the power saving state may comprise a sleep state or a standby state. During the sleep or standby states, the station 106 may not communicate with other stations 106 or the access point 104 of the communication system 100. For example, the station 106 may transmit any communications or receive any communications. The stations 106 having the power saving mode may transition between the power saving mode and the normal state according to user specified schedules. In some aspects, the stations 106 may transition between the power saving mode and the normal state based at least in part on one or more network timers or other parameters established during association with the core network 108.

In some aspects, the station 106 may comprise a Category M (also referred to as "LTE CAT-M", "LTE-M", "Cat-M" or "Cat M") device that is optimized for low power consumption and reduced communication throughput and circuit complexity, thus reducing costs of the stations 106. In some aspects, the station 106 may be a Category M IoT device, and the station 106 may support IMS capability to provide an extended range of services to the station 106. In some aspects, the access point 104 or the device serving the basic service area 102 may have knowledge of the power saving capabilities of the stations 106. The access point 104 may identify the power saving capabilities of the station 106 based on the association probe or request from the station 106 during association with the access point 104. For example, the station 106 may request power saving mode (PSM) timers in the association probe or request during an initial association with the access point 104. In some aspects, the station 106 may include the PSM timers request during a tracking area update (TAU) request. However, such requests may not be conveyed to the core network 108 and, thus, the network core may not be aware of the fact that the station 106 can support PSM.

If the core network 108 is not aware that the station 106 supports PSM, the core network 108 may not consider the PSM capabilities of the station 106 when assigning various timers and parameters to the PSM capable station 106 (e.g., session initiation protocol (SIP) timers for communicating with the core network 108). Such default or non-PSM timers may cause the PSM capable station 106 to access the core network 108 based on the default SIP timer values, which may increase a number of wakeups of the PSM capable station 106, resulting in unnecessary power consumption and potentially increased network utilization by the PSM capable station 106. For example, a PSM capable station 106 may request association timers that allow the station 106 to enter the power saving state (e.g., the power saving mode (PSM)) for approximately four hours. Accordingly, the core network 108 that establishes the four hour timer may not expect the PSM capable station 106 to communicate with the core network 108 for approximately the four hours of the timer. Thus, the core network 108 may not disassociate the station 106 simply because the core network 108 has not communicated with the station 106 for an extended duration based on the four hour timer. Accordingly, the station 106 may enter the power saving state for the four hour period without risk of having to re-associate in order to communicate with the core network 108.

In some aspects, default network designs and algorithms may not efficiently serve the PSM capable station 106, which is better served by a minimal quantity of wakeup cycles. Additionally, or alternatively, in some aspects, there may be no intelligent mechanisms or algorithms that inform the core network 108 that the station is PSM capable and which of a plurality of power saving modes the station 106 is capable of running on. If the PSM capability and PSM mode of operation of the station 106 is known by the core network 108, the core network 108 may better determine a wakeup periodicity of the PSM capable station 106 and align and coordinate the network core activities more efficiently at the core network 108 for that particular PSM capable station.

A Category M device may provide for an extended battery life for a wide range of machine type communication use cases mainly through the use of one or more power saving modes (PSM). The PSMs may allow the Category M device to reduce power consumption and enter a deep sleep mode.

In some implementations, the PSMs may be utilized in Category M devices designed for infrequent data transmission and Category M devices that can accept a corresponding latency in the mobile terminating communication. The Category M device may request a PSM or indicate use of a PSM my communicating a particular timer value or other indicator.

Figure 2:
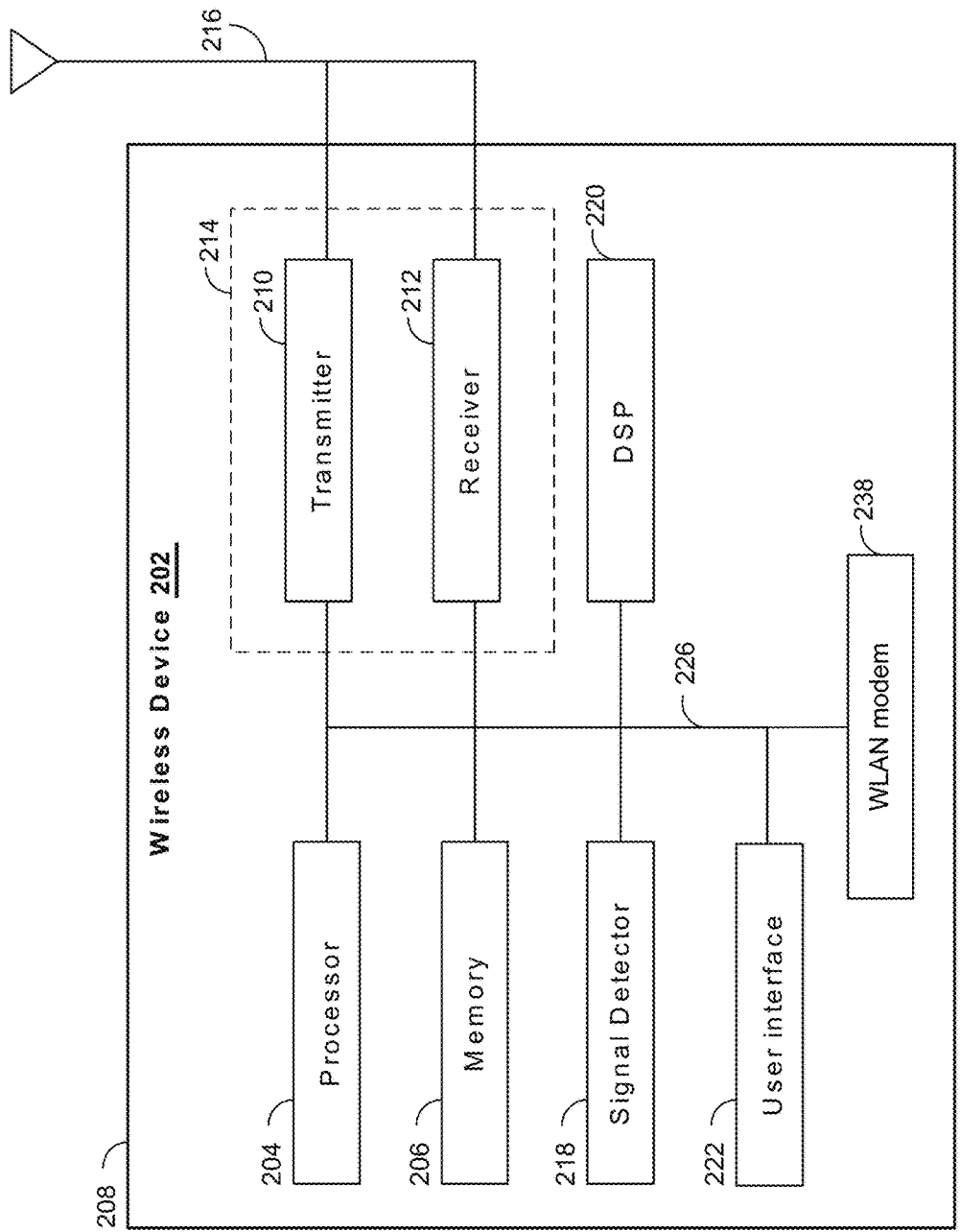
FIG. 2 illustrates various components that may be utilized in a wireless device that may be employed within the wireless communication system of FIG. 1.

FIG. 2 illustrates various components that may be utilized in a wireless device 202 (e.g., the station 106a described in connection with FIG. 1) that may be employed within the wireless communication system 100 of FIG. 1. The wireless device 202 is an example of a device that can be configured to implement the various methods described herein. With respect to the description of FIG. 2 herein, some of the item numbers may refer to the so-numbered aspects described above in connection with FIG. 1. For example, the wireless device 202 may comprise one of the stations 106 and/or the access point 104.

The wireless device 202 may include a processor 204 which controls operation of the wireless device 202. The processor 204 may also be referred to as a central processing unit (CPU) or hardware processor. Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. Furthermore, the wireless device 202 may utilize the memory 206 to store information about other devices on the network to enable the use of certain methods described below, e.g., storing identifiers for particular stations and/or characteristics for stations on the network. The wireless device 202 may then utilize the processor 204 in connection with the memory 206 to analyze the stored data and determine and/or identify various sets, categories, distance characteristics, or otherwise, for the access point 104 or one or more of the stations 106 on the network.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include non-transitory machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. The processor 204 may further comprise a packet generator to generate packets for controlling operation and data communication.

The wireless device 202 may include a transmitter 210 and a receiver 212 to allow transmission and reception of data between the wireless device 202 and a remote location. The transmitter 210 and the receiver 212 may be combined into a transceiver 214. An antenna 216 may be electrically coupled to the transceiver 214. The wireless device 202 may also include (not shown) multiple transmitters, multiple receivers, multiple transceivers, and/or multiple antennas, which may be utilized during multiple-input multiple-output (MIMO) communications, for example. In some embodiments, each of the multiple antennas may be dedicated for the transmission and/or reception of LTE-U, LTE-D, MuL-TEfire, and/or WLAN communications. The wireless device may be covered by a housing unit 208.

The wireless device 202 also comprises a WLAN modem 238 for communicating with WLAN devices. For example, the WLAN modem 238 can enable the wireless device 202 to send, receive, and process WLAN communications. The WLAN modem 238 may contain processing capabilities to operate in both the physical (PHY) layer and the medium access control (MAC) layer for WLAN.

The wireless device 202 may also include a signal detector 218 that may be used in an effort to detect and quantify the level of signals received by the antenna 216, the transmitter 210, the receiver 212, or the transceiver 214. The signal detector 218 may detect such signals in a form of detecting total energy, energy per subcarrier per symbol, power spectral density and others. The wireless device 202 may also include a digital signal processor 220 (which can also be referred to as a "DSP") for use in processing signals. The digital signal processor 220 may be configured to generate a data unit for transmission. In some aspects, the data unit may comprise a physical-layer protocol data unit (PPDU). In some aspects, the PPDU is referred to as a packet. The digital signal processor 220 may be operationally connected to the processor 204 and may share resources with the processor 204.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

Various components of the wireless device 202 may be coupled together by a bus system 226. The bus system 226 may include a data bus, for example, as well as a power bus, a control signal bus, and a status signal bus in addition to the data bus. Those of skill in the art will appreciate various components of the wireless device 202 may be coupled together or accept or provide inputs to each other using some other mechanism.

Although a number of separate components are illustrated in FIG. 2, those of skill in the art will recognize that one or more of these components may be implemented not only with respect to the functionality described above, but also to implement the functionality described above with respect to other components. For example, the processor 204 may be used to implement not only the functionality described above with respect to the processor 204, but also to implement the functionality described above with respect to the signal detector 218 and/or the digital signal processor 220. Each of the components illustrated in FIG. 2 may be implemented using a plurality of separate elements.

As noted above, the wireless device 202 may comprise the access point 104 or the station 106, and may be used to transmit and/or receive communications over licensed or unlicensed spectrums. Specifically, in a non-limiting example, the access point 104 or the station 106 may comprise a WLAN configured to operate on a network with one or more IoT devices present.

Figure 3:
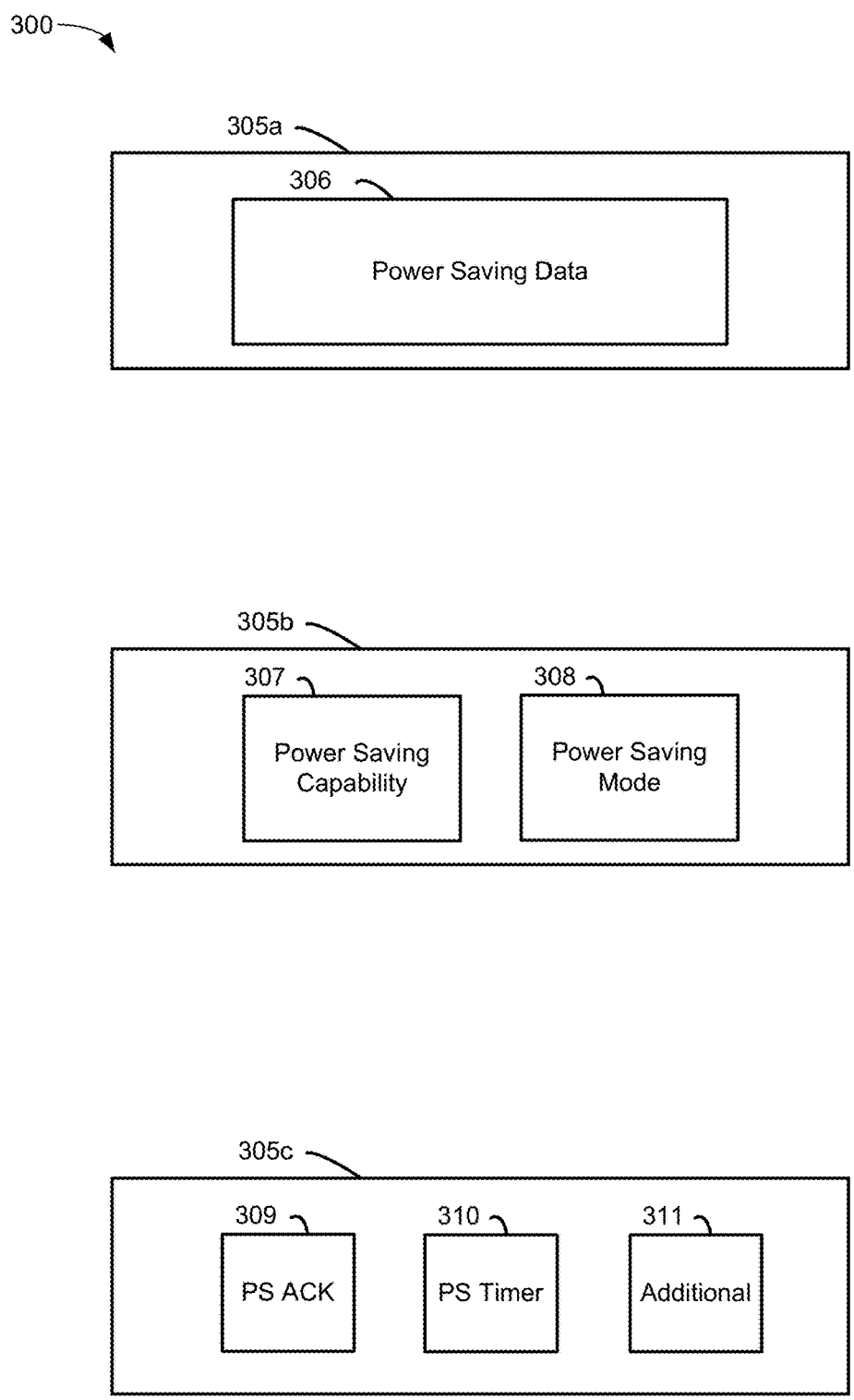
FIG. 3 illustrates example message formats for messages transmitted or received by one or more wireless devices that may be employed within the wireless communication system of FIG. 1.

FIG. 3 illustrates example message 300 formats for messages 300 transmitted or received by one or more wireless devices 106 that may be employed within the wireless communication system 100 of FIG. 1. In some aspects, the message formats shown in FIG. 3 correspond to headers communicated with a message, e.g., an SIP message. With respect to the description of FIG. 3 herein, some of the item numbers may refer to the so-numbered aspects described above in connection with one or more of FIGS. 1 and 2. For example, devices (e.g., the access point 104, the stations 106, etc.) can send messages to one another within a basic service area (e.g., the basic service area 102) via various communication links (e.g., the communication link 110) utilizing, for example, the various components of the wireless device 202.

By the messages shown in FIG. 3, the stations 106 may include a header (e.g., an SIP header) in signaling messages being sent to the core network 108. The stations 106 may use this header to indicate to the core network 108 whether or not the stations 106 have power saving capabilities. Such indications received by the core network 108 may allow the core network 108 to easily identify stations 106 with power saving capabilities and to optimize timers, context preservation, etc., for each station 106 with which the core network 108 communicates. In some aspects, the core network 108 may utilize the information received from the stations 106 to optimize timers proposed for network core re-registration, re-subscribe, re-publish, and/or other core network 108 refresh procedures using the information and/or headers provided.

To that end, FIG. 3 illustrates example message 305a, which is a generic message that could comprise any type of message (e.g., association probe, association request, probe request, probe response, association response, negotiation, acknowledgement, attach, tracking area update (TAU), etc.) and include any combination of types and numbers of packets, fields, data, etc., corresponding to power saving data as represented by a power saving data field 306. The power saving data field 306 may be included in the message 305a as a header or header field. The message 305a comprising the power saving data field 306 may be transmitted by the station 106 attempting to join the communication system 100. The power saving data field 306 may not necessarily be a field, depending on the type of data transfer. For example, the power saving data field 306 may include a plurality of fields or one or more packets, headers, values, flags, etc., or any combination thereof.

Types of information that may be included in the message 305a, relevant to the examples herein, include, for example, a power saving capability indicator and/or a power saving mode field or identifier. Thus, a second example message 305b is illustrated in FIG. 3, which includes additional details regarding the power saving data field 306a included in the header of the message 305b. For example, the header of the message 305a may be formatted as shown in message 305b to include two separate fields, a power saving capability indicator 307 and a power saving mode field 308. As discussed herein, the messages 305a and/or 305b may be communicated as part of an association or probe request, for example as part of an SIP message. In some embodiments, one or more of the messages 305a, 305b, and/or 305c may be included in any or all SIP messages exchanged with the core network 108. Additionally, in some embodiments, one or more of the messages 305a, 305b, and/or 305c may be included in any or all XML configuration access protocol (XCAP) messages that are exchanged with the core network 108. Accordingly, the messages 305a, 305b, and/or 305c may be communicated in SIP messages or any other messages communicated or exchanged with the core network 108. In some embodiments, the header of the message 305b may include one or more additional fields (not shown) to indicate a proposed timer value or other association parameter(s). In some embodiments, the power saving capability indicator 307 may be a single bit that indicates whether the station 106 sending the header information in the message 305b is capable of entering a power saving state or mode or in general capable of saving power. In some embodiments, the SIP headers exchanged via SIP messages (or the headers or messages exchanged via XCAP) may include a single bit indicating that the station 106 is capable of entering a power saving state or mode and a field indicating a power saving mode or type of state into which the station 106 may enter. For example, a "1" may indicate that the station 106 is capable of entering a power saving state or mode. The power saving mode field 308 may indicate which of a plurality of power saving modes the station 106 is operating in or can operate in or will operate in. In some aspects, the station 106 may operate in one of three power saving modes. For example, the station 106 may operate in a 1) power saving mode without network coordination; 2) a release 12 power saving mode without context retention; and 3) a release 12 power saving mode with context retention.

When in the power saving mode without network coordination (1), the station 106 may control the power saving mode in its entirety independent of the core network 108 or any other stations, etc. In this mode, the station 106 may function autonomously with reduced consideration for other devices on the network and with reduced efforts to maintain compliance with the other devices on the network. Additionally, after exiting the power saving mode, the station 106 may not re-attach or re-associate with the network automatically. When in the relation 12 power saving mode without context retention (2), the station 106 may enter the power saving mode with no saving of the network state or the station's state in relation to the core network 108. Accordingly, after exiting the power saving mode and powering up, the station 106 may have to re-attach with the network before associated applications on the station 106 or the core network 108 may begin communicating. In some embodiments, such re-attach after exiting the power saving mode may be automatic. When in the release 12 power saving mode with context retention, the station 106 may retain the station's state in relation to the network (e.g., may save and restore the station's network context) and, accordingly, may not need to re-attach with the network after exiting the power saving mode and powering up. In some embodiments, the station 106 may be able to enter the release 12 power saving mode with context retention if the core network 108 supports release 12 power saving modes.

In response to the probe or association request in which the station 106 indicated the station's power saving capabilities, or as part of an association negotiation process, a third message 305c (i.e., an SIP negotiation message 305c) includes a header that includes a power saving (PS) capability acknowledgement indicator 309, a PS timer field 310, and an additional field 311. In some embodiments, the negotiations between the station 106 and the core network 108 may include an exchange of information such as power saving mode support capability, power saving mode type, and any power saving related timers, timer values, etc. The PS acknowledgement indicator 309 may indicate whether the device sending the message 305c (e.g., the core network 108 in response to the message 305b or the station 106 in response to a previous message 305c received from the core network 108) acknowledges and/or accepts the information received in the preceding message 305b or 305c. The PS timer field 310 may include a timer value or other negotiated parameter. For example, when the message 305c is being communicated for the first time, the PS timer field 310 may include a timer duration value that is being proposed, e.g., by the core network 108 to the station 106. For example, the time values may correspond to an amount of time that the station 106 plans to stay idle following the association, attach, or TAU process and/or an amount of time that the station 106 plans to be in the power saving state. In some aspects, the PS timer field 310 may be measured in hours, minutes, seconds, milliseconds, microseconds, etc. When the message 305c is being communicated in response to another message 305c, the PS timer field 310 may be used to indicate whether the communicating device agrees or accepts the previously communicated PS timer duration. For example, if the core network 108 sends an initial message 305c with a PS timer field 310 value of four hours, the station 106 may respond with a second message 305c with the same PS timer field 310 value of four hours to confirm that the four hour value is accepted. In some embodiments, the PS ACK indicator 309 alone may indicate acceptance of previously communicated parameters or values. In some embodiments, the various fields of the message 305c together may indicate acceptance of one or more previously communicated parameters or values. The additional field 311 may be utilized to negotiate or communicate one or more other parameters during negotiation between the core network 108 and the station 106. For example, the additional field 311 may include one or more other requirements that the station 106 has when associating with the core network 108 (e.g., a guarantee that the core network 108 will be available at a specified duration, a maximum number of terminals that the core network 108 will associate with, etc.). Again, a repeat of values in the additional field 311 may constitute an acknowledgement of the previously communicated value or parameter.

As an illustrative example, if the station 106a wants to communicate with the core network 108 via the access point 104 within the basic service area 102 and over the wireless communication system 100 (e.g., a WLAN), the station 106b may transmit a probe request message or an association request message. The message may include the header information shown in reference to the message 305b and may be transmitted to the access point 104. The access point 104 may then convey the association request to the core network 108. Based on the header information included in the message 305b, both the access point 104 and the core network 108 may become aware of the power saving capabilities of the station 106a. In some aspects, the station 106a may indicate the one or more timer values, e.g., corresponding to the station 106a planned idle time (e.g., time that the station 106a will be idle on the system 100 before entering the power saving mode) and planned power saving time (e.g., time that the station 106a will be in a low power mode and incapable of communications). Accordingly, the station 106a will be asking the core network 108 and the access point 104 to hold any data that arrives for the station 106a for the duration of the low power mode timer. In some aspects, the station 106a may only indicate the station's power saving capability and a specific power saving mode (e.g., mode 2, corresponding to the release 12 power saving mode without context retention) and may wait to negotiate timers with the core network 108 and the access point 104.

Continuing with this example, once the core network 108 and the access point 104 are both aware of the station 106a power saving capability and/or mode, the core network 108 may transmit a response message to the station 106a via the access point 104. In some aspects, the message sent by the core network 108 may correspond to the message 305c including the PS acknowledgment field 309, the PS timer field 310, and the additional field 311. In some aspects, the values in the PS timer field 310 and the additional field 311 may correspond to values the core network 108 received from the station 106a. In some aspects, the values in the PS timer field 310 and the additional field 311 may correspond to default values that the core network 108 uses for stations 106 having power saving capabilities. In some aspects, the values in the PS timer field 310 and the additional field 311 may be based on prior association with the station 106a or a station 106 similar to the station 106a. If the core network 108 is agreeing to values proposed by the station 106a, then the values in the PS timer field 310 and the additional field 311 may be the same as those proposed by the station 106a and the PS acknowledgement indicator 309 may be set to "1". In some aspects, the core network 108 may merely acknowledge the indication of the station 106a power saving capability and the core network 108 may propose values in the PS timer field 310 and the additional field 311. Continuing with this example, the station 106a may agree with the values and parameters proposed by the core network 108 (e.g., idle time of five minutes and power saving time of one hour) via another message 305c including the same values in the PS timer field 310 and the additional field 311 as received from the core network 108 and the PS acknowledgement indicator 309 set to "1".

As discussed above, when each of the station 106a, the station 106b, and the station 106c wish to join the system 100 and to communicate with the core network 108, each of the station 106a, the station 106b, and the station 106c may indicate whether or not they have power saving capabilities and may further negotiation their corresponding power saving timers and parameters directly with the core network 108 (via the access point 104). Accordingly, each of the stations 106a, 106b, and 106c may have different power saving timers and parameters based on their individual negotiations with the core network 108 and their particular preferences and requirements. To that end, the stations 106a, 106b, and 106c may each communicate different values in the PS timer field 310 and the additional field 311 to and from the core network 108, which may indicate that each of the stations 106a, 106b, and 106c have different idle and power saving times. For example, the station 106a may have the values and parameters as identified above. The station 106b may indicate to the core network 108 that the station 106b does not have any power saving capabilities, so none of the negotiations of PS timer or other values needs to be completed. The station 106c may indicate to the core network 108 that the station 106c does have power saving capabilities and will operate in the power saving mode without network coordination. Accordingly, the station 106 may report to the core network 108 a power saving mode on duration (e.g., a duration over which the station 106 may remain in the power saving mode or state) and the core network 108 may utilize such information to determine a schedule for other activities associated with the core network 108. In some embodiments, the core network 108 may schedule activities that do not involve the station 106 for the power saving mode on duration. The core network 108 and the station 106c may agree to an idle time of twenty minutes and a power saving time of one hour. In some aspects, the timer values may be dependent on the capabilities and functionalities of the station 106. For example, the station 106c may perform more communications more often with more importance of the information communicated (e.g., a traffic indicator) than the station 106a, whose communications may be less importance and less frequently needed (e.g., utility meter).

Thus, with reference to the example above, aspects of the present disclosure enable the station 106 to communicate the station's power saving capabilities to the core network 108 and to negotiate times and other parameters that allow the station 106 to maintain the station's power and communication efficiencies. The core network 108 is allowed to optimize core network communications based on awareness of the full capabilities of the associated stations. Accordingly, communications between the stations 106 and the core network 108 may be optimized and the stations 106 are able to maintain their power saving operations while not losing communication privileges.

Figure 4:
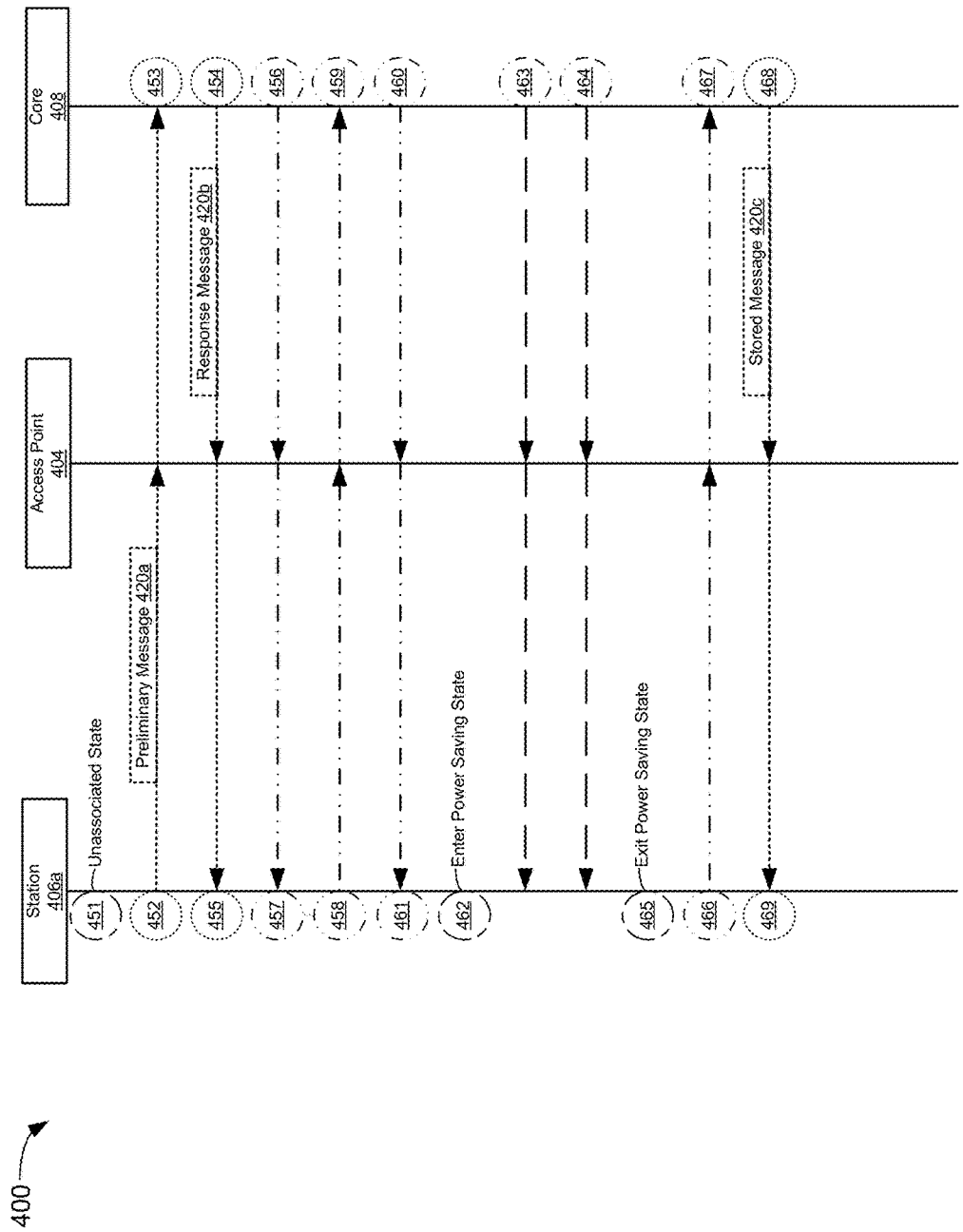
FIG. 4 is a time sequence diagram of example communications between certain of the wireless devices that may be employed within the wireless communication system of FIG. 1, in accordance with an implementation.

FIG. 4 is a time sequence diagram 400 of example communications between certain of the devices that may be employed within the wireless communication system 100 of FIG. 1, in accordance with an implementation. With respect to the description of FIG. 4 herein, some of the item numbers may refer to the so-numbered (or differently numbered) aspects described above in connection with one or more of FIGS. 1-3. To that end, FIG. 4 includes a station 406a, an access point 404, and a network core 408, which may generally correspond to any one of the stations 106, the access point 104, and the core network 108, respectively. Thus, each of the station 406a, the access point 404, and the network core 408 may transmit and receive messages to and from one another, for example, any of the messages 305a, 305b, and 305c, or any other message, packet, communication, or otherwise. Furthermore, one or more of the station 406a, the access point 404, and the network core 408 may form part of a network (e.g., a WLAN), similar to that as illustrated in FIG. 1. Finally, one or more of the station 406a, the access point 404, and the network core 408 may include and utilize various components for communications, for example, the components described in connection with FIG. 2.

As a non-limiting example for purposes of the following description of FIG. 4, the access point 404 may be a wireless router or similar device. The station 406a may be a stationary or mobile smart device (e.g., IoT devices), for example, a cellular phone, a table, a computer, a smart thermostat, a smart oven, or a smart lock. The network core 408 may correspond to an IMS or similar network system. Though not shown, additional stations may be included in this figure with similar communications as shown between the station 406a and the access point 404 and the network core 408. As shown, the stations 406a and the network core 408 progress through various states. While the access point 404 does participate in the communications between the station 406a and the network core 408, the access point states are not shown, as they are presumed to merely be conveyance steps with no special or additional processing of the information received or transmitted.

Although the below examples describe certain messages, transmissions, receptions, requests, responses, identifications, establishments, additional messages, and durations occurring in a particular order, the example order is for simplified, illustrative purposes only. Furthermore, one having ordinary skill in the art will understand that certain of the messages of the examples below are optional and are further for illustrative, non-limiting example purposes only. Finally, although the below examples describe communications from the perspective of one station (e.g., the station 406a), one having ordinary skill in the art will understand that the concepts can be applied to one or more of the other stations (e.g., the stations 106b-106d) or any number of other stations 106 of the system 100 (not pictured).

To continue with this example, at state 451, the station 406a may start at an unassociated state in a non-power saving state. For example, the station 406a may start at a normal operating power and have the ability to communicate messages to the access point 404 and the network core 408 (and any other devices in the system 100). Though not shown, the station 406a receive a beacon from the access point 404 and/or the network core 408 providing details for associating with the access point 404 and/or the network core 408. In some aspects, the details for associating may be stored in the station 406a from a previous association with the system 100.

The station 406a may first determine to associate with the access point 404 and the network core 408. To achieve this, at transmission 452, the station 406a may send a preliminary message 420a via the access point 404 to the network core 408, which receives the preliminary message 420a at reception 453. The preliminary message 420a may be similar to the message 305a. In some aspects, the preliminary message 420a may also include additional information or fields included in one of the header information or the body of the message 305a. In some aspects, the message 305a may comprise an association request, a probe request, an attach request, a TAU request, and/or any other messages described herein, and such messages may also be referred to herein as "preliminary communications," "preliminary messages," "one or more preliminary communications," or "one or more preliminary messages." Thus, via the preliminary message 420a, the station 406a may indicate the station's power saving mode capabilities and power saving mode of operation to the access point 404 and the network core 408. In some aspects, the preliminary message 420a may include proposed timer or other parameter values (not shown).

In response to receiving the preliminary message 420a, the network core 408 may send a response message 420b to the station 406a via the access point 404 at transmission 454, which the station 406a may receive at reception 455. The response message 420b may correspond to the message 305b. In some aspects, the response message 420b may include an acknowledgement of the power saving capability (if such capability exists) of the station 406a. If the station 406a is power saving capable, the response message 420b may further include one or more parameters or values that can be negotiated between the network core 408 and the station 406a. For example, the response message 420b may include proposed PS timer values and/or additional values. In some embodiments, the response message 420b may not include the proposed PS timer values and/or additional values and instead only include acknowledgement of the power saving capability of the station 406a in the response message 420b. Accordingly, in some embodiments, the network core 408 may send an additional message at transmission 456 to the station 406a via the access point 404, which the station receives at reception 457. In some embodiments, the response message 420b may include details of operations or activities that the network core 408 intends to schedule during the PS time of the station 406a. In aspects where the response message 420b did not include the timer values or parameters, the additional message may include the proposed or agreed to timer values or other parameters. If the station 406a agrees with the values or parameters proposed by the core network 408 via its transmissions 454 or 456, then the station 406a may communicate the station's acceptance by transmitting a message at transmission 458 to the core network 408 via the access point 404, which the core network 408 receives at reception 459. In some aspects, the message transmitted by the station 406a at transmission 458 may correspond to the message 305c, where the values of the PS timer field 310 and the additional field 311 are the same as those received from the core network 408. In some aspects, the station 406a may not agree with the values or parameters proposed by the core network 408 and may propose alternative values or parameters that the core network 408 receives at reception 459 and agrees to in a message transmitted at transmission 460. Accordingly, the station 406a may receive this message via the access point 404 at reception 461. The negotiations between the station 406a and the core network 408 may continue for additional or fewer cycles than shown in FIG. 4.

Once the station 406a and the core network 408 agree to power saving timer values and parameters, the station 406a may enter a power saving state or mode at state 462. In some aspects, this may occur after the station 406a was idle and available to receive and send communications. Once the station 406a enters the power saving state at 462, the station 406a may be unable to send and receive communications. Accordingly, messages transmitted by the core network 408 at transmission 463 and/or 464 via the access point 404 may not be received by the station 406a. Accordingly, when there are messages directed to the station 406a while the station 406a is in the power saving state, one of the core network 408 and the access point 404 may store or otherwise save the information directed to the station 406a. Since the access point 404 and the core network 408 are aware of the negotiated timers (e.g., the idle timer and the power saving timer), both the access point 404 and the core network 408 may be aware of when the station 406a is in the power saving state. In some aspects, the station 406a may transmit a message indicating that the station 406a is entering the power saving state (not shown).

At state 465, the station 406a may exit the power saving state. Accordingly, the station 406a may optionally transmit, at transmission 466, a message to the core network 408 via the access point 404 indicating that the station 406a has exited the power saving state, which the core network 408 receives at reception 467. In some aspects, since the access point 404 and the core network 408 may both be aware of the negotiated timers, the station 406a may not need to transmit a message indicating the exit from the power saving state. Instead, the core network 408 may automatically transmit, at transmission 468, a stored message 420c to the station 406a via the access point 404, which the station 406a receives at reception 469, based on the known timer duration.

This process may be repeated for other stations 106 or for additional transitions between power saving states for the station 406a. Although not pictured, any number of additional messages may occur while the station 406a is in the energy saving state and these additional messages may be stored and consolidated into the stored message 420c. Additionally, although not shown, the station 406a and the core network 408 may renegotiate timers or other values or parameters once the station 406a is associated with the core network 408.

Thus, in accordance with the above examples, contrary to existing systems, the station 408 will not disassociate from the core network 408 or re-associate with the core network 408 every time the station 408 enters the power saving state. The examples discussed herein help provide advantages of improved power savings, reduced communications and improved awareness of capabilities of network devices. Advantageously, particularly for Internet of Things (IoT) devices that commonly utilize small data transmissions, these devices will be able to participate in network communications and integration with the core network.

Figure 5:
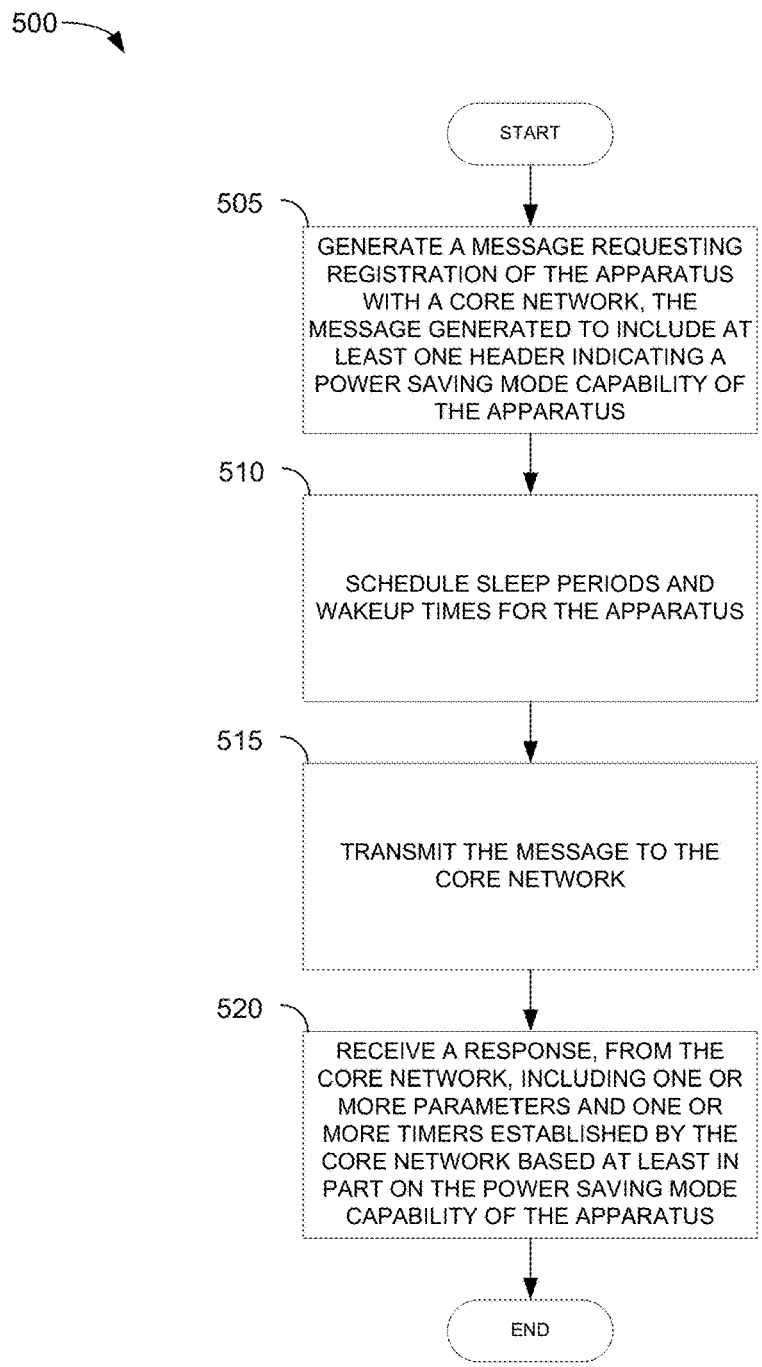
FIG. 5 is a flowchart of a method for wireless communication, in accordance with an implementation.

FIG. 5 is a flowchart of a method for wireless communication, in accordance with an implementation. For example, the method 500 could be performed by the station 106a illustrated in FIG. 1. Method 500 may also be performed by one or more of the stations 106b-106d. A person having ordinary skill in the art will appreciate that the method 500 may be implemented by other suitable devices and systems. Although the method 500 is described herein with reference to a particular order, in various aspects, blocks herein may be performed in a different order, or omitted, and additional blocks may be added.

The method 500 begins at block 505. Block 505 includes generating a message requesting registration of the apparatus with a core network, the message generated to include at least one header indicating a power saving mode capability of the apparatus. Once the message is generated, the method 500 proceeds to block 510. Block 510 includes scheduling sleep periods and wakeup times for the apparatus. The method 500 then proceeds to block 515, which includes transmitting the message to the core network. Block 520 of the method 500 includes receiving a response, from the core network, including one or more parameters and one or more timers established by the core network based at least in part on the power saving mode capability of the apparatus.

Operation block 1015 includes estimating an amount of impedance change required to operate the power amplifier 610 with the threshold range. In some implementations, the controller 625 uses the measured impedance from the AC power and impedance measurement circuit 620 and limits of the threshold range to calculate the amount of impedance change that would place the measured impedance within the limits of the threshold range.

A Category M apparatus that communicates over a communication network may perform one or more of the functions of method 500, in accordance with certain aspects described herein. In some aspects, the apparatus may comprise various means for performing the one or more functions of method 500. For example, the Category M apparatus may comprise means for generating a message requesting registration of the apparatus with a core network, the message generated to include at least one header indicating a power saving mode capability of the apparatus. In certain aspects, the means for generating a message can be implemented by the processor 204 (FIG. 2). In certain aspects, the means for generating a message can be configured to perform the functions of block 505 (FIG. 5). The apparatus may comprise means for scheduling sleep periods and wakeup times for the apparatus. In some aspects, the means for scheduling may comprise multiple steps. For example, the means for scheduling may comprise identifying parameters according to which the information to be included in the message and identifying a structure of the message to be generated (e.g., included elements or information, etc.). The means for generating a message may further comprise forming the message of the identified structure to include the obtained information, where the obtained information includes information from a memory or processor regarding the power saving mode capabilities of the apparatus. In certain aspects, the means for scheduling can be implemented by the processor 204. In certain aspects, the means for scheduling can be configured to perform the functions of block 510. The apparatus may comprise means for transmitting the message to the core network. In certain aspects, the means for transmitting can be implemented by the transmitter 210 or the transceiver 214. In certain aspects, the means for transmitting can be configured to perform the functions of block 515. The apparatus may comprise means for receiving a response, from the core network, including one or more parameters and one or more timers established by the core network based at least in part on the power saving mode capability of the apparatus. In certain aspects, the means for receiving can be implemented by the receiver 212 or the transceiver 214. In certain aspects, the means for receiving can be configured to perform the functions of block 520.

Furthermore, in some aspects, the various means of the Category M apparatus may comprise algorithms or processes for performing one or more functions. For example, according to these algorithms or processes, the apparatus may obtain information to be included in the message and identify a structure of the message to be generated (e.g., included elements or information, etc.). The apparatus may further form the message of the identified structure to include the obtained information, where the obtained information includes information from a memory or processor regarding the power saving mode capabilities of the apparatus. The apparatus may sleep and wakeup times according to the power saving mode capability. In some aspects, the apparatus may determine the sleep and wakeup times according to a particular power saving mode in which the apparatus is operating. The apparatus may transmit the generated message to the core network by packaging it for communication via a particular protocol (e.g., SIP or XCAP). Further, the apparatus may receive and unpack a communication via the protocol, wherein the communication includes a response to the registration request and includes various parameters and/or timers established by the core network.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term "determining" and/or "identifying" encompass a wide variety of actions. For example, "determining" and/or "identifying" may include calculating, computing, processing, deriving, choosing, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, identifying, establishing, selecting, choosing, determining and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) signal or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an access point 104, a station 106, and/or another device as applicable. For example, such a device can be coupled to a server to facilitate the transfer of means for performing the methods described herein. In some aspects, the means for receiving may comprise one or more of the receiver 212, the transceiver 214, the digital signal processor 220, the processor 204, the memory 206, the signal detector 218, the antenna 216, the WLAN modem 238, or equivalents thereof. In some aspects, means for transmitting may comprise one or more of the transmitter 210, the transceiver 214, the digital signal processor 220, the processor 204, the memory 206, the WLAN modem 238, the antenna 216, or equivalents thereof. In some aspects, the means for determining, means for identifying, means for generating, means for matching, means for storing, and/or means for adjusting may comprise one or more of the digital signal processor 220, the processor 204, the memory 206, the user interface 222, the WLAN modem 238, or equivalents thereof. Alternatively, various methods described herein can be provided via storage means (e.g., RAM, ROM, a physical storage medium such as a compact disc (CD) or floppy disk, etc.), such that a wireless device 202, an access point 104, a station 106, and/or another device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A Category M apparatus that communicates over a communication network, the apparatus comprising:
  a processor configured to:
    generate a message requesting registration of the apparatus with a core network, the message generated to include at least one header indicating:
      a power saving mode capability of the apparatus, and
      a particular power saving mode in which the apparatus is configured to operate, and
    schedule sleep periods and wakeup times for the apparatus; and
  an interface configured to:
    transmit the message to the core network,
    receive a response, from the core network, including one or more parameters and one or more timers proposed by the core network for negotiation based at least in part on the power saving mode capability of the apparatus, and
    transmit an acknowledgment of the response accepting the one or more parameters and one or more timers to the core network prior to the apparatus entering the particular power saving mode,
  wherein the at least one header is a session initiation protocol (SIP) header or an XML configuration access protocol (XCAP) header and includes a bit or field indicating the power saving mode capability of the apparatus.

2. The apparatus of claim 1, wherein the at least one header further indicates that the apparatus is capable of operating in one or more of a power saving mode without network coordination, a Release 12 power saving mode without context retention, or a Release 12 power saving mode with context retention.

3. The apparatus of claim 1, wherein the message further comprises one or more timer values associated with the power saving mode capability of the apparatus, wherein the one or more timer values indicate a duration for which the apparatus enters the power saving mode.

4. The apparatus of claim 1, wherein the received response further includes at least one indicator of one or more activities coordinated, by the core network, based on the sleep periods and wakeup times.

5. A method of communicating over a communication network by a Category M apparatus, the method comprising:
  generating a message requesting registration of the apparatus with a core network, the message generated to include at least one header indicating:
    a power saving mode capability of the apparatus, and
    a particular power saving mode in which the apparatus is configured to operate;
  scheduling sleep periods and wakeup times for the apparatus;
  transmitting the message to the core network;
  receiving a response, from the core network, including one or more parameters and one or more timers proposed by the core network for negotiation based at least in part on the power saving mode capability of the apparatus, and
  transmitting an acknowledgment of the response accepting the one or more parameters and one or more timers to the core network prior to the apparatus entering the particular power saving mode,
  wherein the at least one header is a session initiation protocol (SIP) header or an XML configuration access protocol (XCAP) header and includes a bit or field indicating the power saving mode capability of the apparatus.

6. The method of claim 5, wherein the at least one header further indicates that the apparatus is capable of operating in one or more of a power saving mode without network coordination, a Release 12 power saving mode without context retention, or a Release 12 power saving mode with context retention.

7. The method of claim 5, wherein the message further comprises one or more timer values associated with the power saving mode capability of the apparatus, wherein the one or more timer values indicate a duration for which the apparatus enters the power saving mode.

8. The method of claim 5, wherein the received response further includes at least one indicator of one or more activities coordinated, by the core network, based on the sleep periods and wakeup times.

9. A Category M apparatus that communicates over a communication network, the apparatus comprising:
- means for generating a message requesting registration of the apparatus with a core network, the message generated to include at least one header indicating:
  - a power saving mode capability of the apparatus, and
  - a particular power saving mode in which the apparatus is configured to operate;
- means for scheduling sleep periods and wakeup times for the apparatus;
- means for transmitting the message to the core network;
- means for receiving a response, from the core network, including one or more parameters and one or more timers proposed by the core network for negotiation based at least in part on the power saving mode capability of the apparatus, and
- wherein the means for transmitting further transmits an acknowledgment of the response accepting the one or more parameters and one or more timers to the core network prior to the apparatus entering the particular power saving mode,
- wherein the at least one header is a session initiation protocol (SIP) header or an XML configuration access protocol (XCAP) header and includes a bit or field indicating the power saving mode capability of the apparatus.

10. The apparatus of claim 9, wherein the at least one header further indicates that the apparatus is capable of operating in one or more of a power saving mode without network coordination, a Release 12 power saving mode without context retention, or a Release 12 power saving mode with context retention.

11. The apparatus of claim 9, wherein the message further comprises one or more timer values associated with the power saving mode capability of the apparatus, wherein the one or more timer values indicate a duration for which the apparatus enters the power saving mode.

12. The apparatus of claim 9, wherein the received response further includes at least one indicator of one or more activities coordinated, by the core network, based on the sleep periods and wakeup times.

13. A non-transitory, computer-readable storage medium, comprising code executable to:
- generate a message requesting registration of the apparatus with a core network, the message generated to include at least one header indicating:
  - a power saving mode capability of the apparatus, and
  - a particular power saving mode in which the apparatus is configured to operate;
- schedule sleep periods and wakeup times for the apparatus;
- transmit the message to the core network;
- receive a response, from the core network, including one or more parameters and one or more timers proposed by the core network for negotiation based at least in part on the power saving mode capability of the apparatus, and
- transmit an acknowledgment of the response accepting the one or more parameters and one or more timers to the core network prior to the apparatus entering the particular power saving mode,
- wherein the at least one header is a session initiation protocol (SIP) header or an XML configuration access protocol (XCAP) header and includes a bit or field indicating the power saving mode capability of the apparatus.

14. The medium of claim 13, wherein the at least one header further indicates that the apparatus is capable of operating in one or more of a power saving mode without network coordination, a Release 12 power saving mode without context retention, or a Release 12 power saving mode with context retention.

15. The medium of claim 13, wherein the message further comprises one or more timer values associated with the power saving mode capability of the apparatus, wherein the one or more timer values indicate a duration for which the apparatus enters the power saving mode.

16. The medium of claim 13, wherein the received response further includes at least one indicator of one or more activities coordinated, by the core network, based on the sleep periods and wakeup times.

* * * * *